US006901145B1

(12) United States Patent
Bohannon et al.

(10) Patent No.: US 6,901,145 B1
(45) Date of Patent: May 31, 2005

(54) GENERATION OF REPEATABLE CRYPTOGRAPHIC KEY BASED ON VARYING PARAMETERS

(75) Inventors: Philip L. Bohannon, Piscataway, NJ (US); Bjorn Markus Jakobsson, Hoboken, NJ (US); Fabian Monrose, New York, NY (US); Michael Kendrick Reiter, Raritan, NJ (US); Susanne Gudrun Wetzel, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/501,902

(22) Filed: Feb. 10, 2000

Related U.S. Application Data

(60) Provisional application No. 60/128,413, filed on Apr. 8, 1999, and provisional application No. 60/147,880, filed on Aug. 9, 1999.

(51) Int. Cl.$^7$ ............................................. H04L 9/00
(52) U.S. Cl. ............................ 380/44; 380/45; 380/47; 380/277; 380/286; 713/165; 713/168; 713/171; 713/202
(58) Field of Search ............................ 380/44; 713/165

(56) References Cited

U.S. PATENT DOCUMENTS

| | | | | |
|---|---|---|---|---|
| 4,805,222 A | | 2/1989 | Young et al. ................... 382/2 |
| 4,876,725 A | | 10/1989 | Tomko ........................... 382/4 |
| 5,369,707 A | * | 11/1994 | Follendore, III ............ 713/155 |
| 5,541,994 A | | 7/1996 | Tomko et al. ................. 380/30 |
| 5,557,346 A | * | 9/1996 | Lipner et al. ............... 380/286 |
| 5,557,686 A | * | 9/1996 | Brown et al. ............... 382/115 |
| 5,625,692 A | * | 4/1997 | Herzberg et al. ........... 380/286 |
| 5,680,460 A | | 10/1997 | Tomko et al. ................. 380/23 |
| 5,712,912 A | * | 1/1998 | Tomko et al. .............. 713/186 |
| 5,737,420 A | | 4/1998 | Tomko ........................... 380/23 |
| 5,740,276 A | | 4/1998 | Tomko et al. .............. 382/210 |
| 5,761,330 A | | 6/1998 | Stoianov et al. ............. 382/127 |
| 5,790,668 A | | 8/1998 | Tomko ........................... 380/25 |

(Continued)

FOREIGN PATENT DOCUMENTS

WO   WO 9605673 A1   2/1996   ............. H04L/9/08

OTHER PUBLICATIONS

Mytec Technologies Inc., Mytec: Biometrics, downloaded from Internet website http://www.mytec.com/biometrics/ on Nov. 1, 1999.

(Continued)

*Primary Examiner*—Thomas R. Peeso
*Assistant Examiner*—Syed A. Zia
(74) *Attorney, Agent, or Firm*—Jeffrey Weinick; Donald P. Dinella

(57) ABSTRACT

A repeatable cryptographic key is generated based on varying parameters which represent physical measurements. Locations within a share table, which locations store valid and invalid cryptographic shares, are identified as a function of received varying parameters. The share table is configured such that locations which are expected to be identified by legitimate access attempts contain valid cryptographic shares, and locations which are not expected to be identified by legitimate access attempts contain invalid cryptographic shares. The share table configuration may be modified based on prior history of legitimate access attempts. In various embodiments, the stored shares may be encrypted or compressed. A keystroke feature authentication embodiment uses the inventive techniques to implement an authentication system which authenticates based on an entered password and the manner in which (e.g. keystroke dynamics) the keystroke is entered. Another embodiment uses the inventive techniques to protect sensitive database information which is accessible using DNA measurements.

24 Claims, 3 Drawing Sheets

U.S. PATENT DOCUMENTS

| | | | | |
|---|---|---|---|---|
| 5,802,175 A | * | 9/1998 | Kara | 380/277 |
| 5,832,091 A | | 11/1998 | Tomko et al. | 380/30 |
| 5,991,408 A | * | 11/1999 | Pearson et al. | 713/186 |
| 6,035,042 A | * | 3/2000 | Mittenthal | 380/37 |
| 6,317,834 B1 | * | 11/2001 | Gennaro et al. | 713/186 |

OTHER PUBLICATIONS

Mytec Technologies Inc., Mytec: Products—Mytec Gateway, downloaded from Internet website http:// www.mytec.com/products/gateway on Nov. 1, 1999.

Mytec Technologies Inc., Mytec: Why Mytec, downloaded from Internet website http://www.mytec.com/why-mytec.htm on Nov. 1, 1999.

Mytec Technolgies Inc., Mytec: Mytec: Products—Touchstone Pro, downloaded from Internet website http//:www.mytec.com/products/touchstone on Nov. 1, 1999.

BIOPassword, Net Nanny Software International Inc. 1994–1998, Bellevue, WA USA, pp. 2–9, 1–3.

F. Monrose, M.K. Reiter, and S. Wetzel, "Password hardening based on keystroke dynamics," *Proceedings of the 6<sup>th</sup> ACM Conference on Computer and Communications Security*, Nov. 1999, pp. 73–82.

C. Soutar and G.J. Tomko; "Secure Private Key Generation Using a Fingerprint," Cardtech/Securetech Conference Proceedings, vol. 1, May 1996, pp. 245–252.

European Patent Search Report, Application No. 00302540.0–1237–, The Hague, Jun. 5, 2002.

Shamir, A., *How to Share a Secret*, Communications of the ACM, vol. 22, No. 11, Nov., 1979, pp. 612–613.

Davida, G. I:, et al:, *On Enabling Secure Applications Through Off–line Biometric Identification*, IEEE, 1998, pp. 148–157.

Monrose, F. et al:, *Password Hardening Based on Keystroke Dynamics*, ACM, 1999, pp. 73–82.

* cited by examiner

| | 1 | 2 | 3 | 4 | 5 | 6 | 7 | 8 | 9 | 10 |
|---|---|---|---|---|---|---|---|---|---|---|
| $\psi_1 \to 1$ | ✓ | ✓ | ✓ | X | X | X | X | X | X | X |
| $\psi_2 \to 2$ | X | X | X | X | ✓ | ✓ | X | X | X | X |
| $\psi_3 \to 3$ | X | X | X | X | X | X | ✓ | ✓ | ✓ | X |
| $\psi_4 \to 4$ | X | X | ✓ | ✓ | X | X | X | X | X | X |

| (1,1) 1 | (1,2) 2 | (1,3) 3 | (1,4) 4 |
|---|---|---|---|
| (2,1) 5 | (2,2) 6 | (2,3) 7 | (2,4) 8 |
| (3,1) 9 | (3,2) 10 | (3,3) 11 | (3,4) 12 |
| (4,1) 13 | (4,2) 14 | (4,3) 15 | (4,4) 16 |

$\psi_1 \rightarrow$ $E_{\psi_1}$ – EXPECTED $(X_1, Y_1)$
$\psi_2 \rightarrow$ $E_{\psi_2}$ – EXPECTED $(X_2, Y_2)$
$\vdots$
$\psi_m \rightarrow$ $E_{\psi_m}$ – EXPECTED $(X_m, Y_m)$

400

| SUCCESSFUL ACCESS ATTEMPT | MEASURED PARAMETERS |
|---|---|
| LAST | $\phi_1, \phi_2, \ldots \phi_m$ |
| LAST-1 | $\phi_1, \phi_2, \ldots \phi_m$ |
| LAST-2 | $\phi_1, \phi_2, \ldots \phi_m$ |
| ⋮ | |
| LAST-n | $\phi_1, \phi_2, \ldots \phi_m$ |

GENERATION OF REPEATABLE CRYPTOGRAPHIC KEY BASED ON VARYING PARAMETERS

This application claims the benefit of U.S. Provisional Application Ser. No. 60/128,413, filed Apr. 8, 1999 and U.S. Provisional Application Ser. No. 60/147,880 filed Aug. 9, 1999, both of which are incorporated herein by reference.

FIELD OF THE INVENTION

The present invention relates generally to computer security. More particularly, the present invention relates to the generation and use of cryptographic keys for computer security applications.

BACKGROUND OF THE INVENTION

As computer use becomes more widespread, the problem of computer system security also becomes increasingly critical. The volume of information stored in computer systems is growing at a large rate. Further, the accessibility of such information systems is increasing due to the interconnection of computer systems through networks such as the Internet. A major problem facing computer owners is how to protect computer systems, and the information they contain, from adversaries wishing to gain unauthorized access to stored information.

One type of computer system security is referred to as authentication. Authentication refers to confirming the identity of a user prior to allowing access to a computer system. Most authentication schemes are based on the user's knowledge of a secret, called a password. A user must have knowledge of a secret password in order to gain access to the computer system.

Another type of computer system security is referred to as encryption. Some, or all, of the information on the computer system may be encrypted such that the information is rendered unreadable or unusable until it is decrypted. Like authentication, decryption also relies on the knowledge of a secret, called a key, which is used to decrypt the information. Thus, even though a person may have access to information, that information may be useless to someone who does not possess the appropriate decryption key.

These two security techniques of authentication and encryption are related in many ways. For example, a secret known by a user may serve as both a password and a decryption key. Further, a computer system may employ both types of security techniques.

With respect to authentication, textual passwords have been, and remain, the primary means of authenticating users. However, passwords have been shown to be a relatively weak mechanism for authentication. Studies have shown that users tend to choose passwords that can be easily guessed by an exhaustive search of a relatively small subset of all possible passwords. For example, in a study of 14,000 computer system passwords, it was found that almost 24% of the passwords could be found in a "dictionary" of only $3 \times 10^6$ words. Considering the high speed at which a computer could generate and test $3 \times 10^6$ words, passwords are considered to be a weak form of computer security.

One known technique for strengthening passwords is to require not only that the correct password be typed, but also that the user's keystroke features (e.g. duration of keystrokes and latency between keystrokes) match a predetermined stored model of expected keystroke features. This technique is effective against so-called online attacks in which an adversary is attempting to gain access to a computer system through the computer's authentication system. However, this technique is not effective against a so-called off-line attack, in which an adversary gains physical access to the computer's data, for example by taking physical possession of a laptop computer or by otherwise circumventing the computer's authentication system. Once an adversary has physical access to computer information, the above described keystroke feature technique is ineffective. Further, if an adversary gets physical access to a computer which allows access to the stored keystroke feature models, the models may leak sensitive information which would then make it easier for the adversary to determine actual user passwords.

Other techniques exist which do not require the storage of such models in memory. For example, U.S. Pat. No. 5,680,460 describes a technique in which a user's fingerprint characteristics are measured and various filters are applied to the measurements to generate a key which can then be used to authenticate the user on a computer system. Another example is G. I. Davida, Y. Frankel, and B. J. Matt, *On Enabling Secure Applications Through Off-Line Biometric Identification*, Proceedings of the 1998 IEEE Symposium on Security and Privacy, pp. 148–157, May 1998, in which error correcting parameters are used to decode biometric (e.g. iris scan) readings into a canonical form for a particular user. This canonical form may then be used to generate a key for authentication purposes. However, both of these techniques also suffer from the above described deficiency in that any compromise of the underlying system data (either the filters or the error correcting parameters) will leak sensitive information which, in certain applications, would allow an adversary to more easily determine the user's authentication key.

SUMMARY OF THE INVENTION

The present invention provides for the generation of a repeatable cryptographic key based on potentially varying parameters which are received, for example, during a computer resource access attempt. The key is repeatable in that the same key may be generated using different received parameters. In accordance with the invention, so-called cryptographic shares are retrieved from memory locations identified as a function of the parameters. The key may be determined from knowledge of a sufficient number of cryptographic shares.

In accordance with one embodiment, values of the received parameters are used to generate indices into a so-called share table which stores valid and invalid cryptographic shares. Valid cryptographic shares (i.e., those which may be used to generate the key) are stored in memory locations whose indices are expected to be generated during legitimate access attempts. Invalid cryptographic shares (i.e., those which may not be used to generate the key) are stored in memory locations whose indices are not expected to be identified during legitimate access attempts. Thus, the share table may be configured to take into account expected variations in the received parameters. In accordance with one technique, valid shares may be periodically replaced with invalid shares (and vice versa) based on a history of access attempts and a change in expected parameter values.

In various embodiments, the stored shares may be encrypted in various ways. In one embodiment, the shares are encrypted using a value computed as a function of expected parameter values. In this embodiment, one encrypted share is stored and associated with each parameter. When a parameter is received during an access attempt, the associated stored encrypted share is retrieved from memory and an attempt to decrypt the share is made using a value computed as a function of the parameter value. Only if the computed value is the same as the value used to encrypt the share (i.e., the expected value) will a valid share be obtained. Otherwise, an invalid share will be obtained. In various embodiments, the cryptographic shares may be chosen so as to allow generation of the key even if some number of invalid shares are generated, as long as a sufficient number of valid shares are generated. This embodiment is particularly advantageous when the number of possible parameter values is very large. This embodiment is described in further detail below in accordance with an embodiment of the invention in which the contents of a database may be decrypted using parameters representing measured DNA information.

Various secret sharing schemes may be used to generate the cryptographic shares. In accordance with one embodiment of the invention, a so-called polynomial secret sharing scheme is used. In this embodiment, the secret key is the point where the polynomial crosses the y axis and the cryptographic shares are points on the polynomial. Knowledge of a sufficient number of points on the polynomial (i.e., cryptographic shares), allows for the determination of the polynomial, and thus determination of the key. These polynomial points may be stored in a straightforward manner by storing (x,y) pair values in the share table. Alternatively, in order to save memory space (at the expense of an increase in computational complexity) compressed shares may be stored in the share table.

In accordance with an advantageous embodiment of the invention, the inventive techniques are used to implement a keystroke feature authentication system in which users are authenticated based on a combination of an entered password and the manner in which the password was typed. In accordance with this embodiment, a share table contains a row for each keystroke feature to be considered (e.g., duration of keypresses, latencies between keypresses). Upon receipt of a measured keystroke parameter, a function chooses one of two columns in the share table associated with the parameter row, depending on a comparison of the parameter with a predetermined threshold. A history of legitimate authentications is kept. When a measured keystroke parameter consistently results in the function choosing one of the two columns, the associated keystroke feature is considers a distinguishing feature, and the other of the two columns in the share table is updated to contain an invalid cryptographic share. Over time, the share table is updated such that only share table entries which are expected to be accessed during future legitimate access attempts contain valid cryptographic shares, while the share table entries which are not expected to be accessed during a legitimate access attempt contain invalid cryptographic shares. In this manner, an illegitimate access attempt will retrieve invalid cryptographic shares from the share table such that it will not be possible to generate the cryptographic key. In accordance with another aspect of this embodiment, the shares stored in the share table are encrypted using the password as the decryption key in order to add additional security.

These and other advantages of the invention will be apparent to those of ordinary skill in the art by reference to the following detailed description and the accompanying drawings.

BRIEF DESCRIPTION OF THE DRAWINGS

FIG. 3 illustrates a share table which stores compressed cryptographic shares;

FIG. 4 illustrates a share table which stores encrypted cryptographic shares;

DETAILED DESCRIPTION

Figures 1, 2:
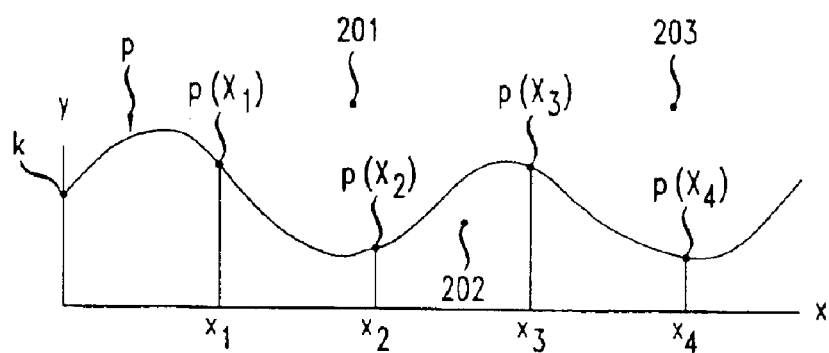
FIG. 1 shows an exemplary share table.
FIG. 2 illustrates an exemplary polynomial which may be used in conjunction with a polynomial secret sharing scheme.

The present invention provides for the generation of a repeatable cryptographic key based on a set of potentially varying parameters. The cryptographic key is repeatable in that the same key is generated notwithstanding that the parameters, on which generation of the key is based, may vary from one generation of the key to the next. In an advantageous embodiment, the parameters represent measurements of some physical characteristics of either a person or a thing. For example, one class of physical characteristics is biometric characteristics of a person. As used herein, the term biometric characteristics includes any measurable biological, physiological, or biomechanical characteristics of a person. Such characteristics include, for example, fingerprint, iris, DNA, typing patterns, voice, blood, etc. Thus, for computer security applications of the present invention, any biometric characteristic, or combination of biometric characteristics, which could reasonably identify a particular person would be appropriate. Another class of physical characteristics are the characteristics of things (e.g. non-biological items). Such characteristics include, for example, chemical or molecular composition, etc. Although the following description describes the invention in terms of parameters representing measurements of physical characteristics, it is to be understood that the invention is not limited to any particular type of parameters, but instead applies to any type of varying parameters.

Actual measurement techniques will vary depending on the embodiment of the invention, and the details of particular measurement techniques are not the subject of this invention. It is the use of the physical measurements, once obtained, to generate a repeatable cryptographic key for use in computer security applications that is the subject of this invention. Thus, we assume that the measurements have been made and that we are supplied with physical measurement parameters, represented here as parameters: $\phi_1, \phi_2, \ldots \phi_m$.

It is expected that the measurements of the same physical characteristics of the same entity may vary from one measurement to the next. This may be due to two factors. First, the measured physical characteristic itself may be dynamic. For example, if the measured physical characteristic were the biometric characteristics of voice (e.g. pitch, amplitude) during the speaking of some word or phrase, it is expected that an individual's voice characteristics will not be exactly the same during repeated vocalizations of the same word or phrase. As such, the measured characteristics represented as parameters $\phi_1, \phi_2, \ldots \phi_m$ will be different even though the same person speaks the same word or phrase. Second, the measured physical characteristic itself may be static, but the measurement of the physical characteristic may be imprecise or incomplete. For example, a person's fingerprint is static, but the results of different measurements of the same fingerprint may change slightly, due to imprecise measuring equipment, or because of an incomplete sample.

One of the advantages of the present invention is its ability to generate a repeatable cryptographic key in view of varying measurements. As a result, the invention may be used for various computer security applications. For example, as will be described in further detail below, in one embodiment the inventive technique is used to authenticate computer system users based on particular keystroke features during entry of a password. A user must be authenticated even though his/her keystroke features will change slightly during multiple entries of the same password. The present invention will generate a repeatable key for a particular user if the keystroke feature measurements vary within certain tolerances, thus authenticating the user.

In another embodiment (also discussed in further detail below) the invention may be used to protect information in a sensitive database containing private information. For example, consider a database which contains private information of convicted felons which is only meant to be used for legitimate criminal investigation purposes. For example, if a criminal is suspected of a crime the database record for only that particular criminal should be accessible by investigators. As such, each record in the database is encrypted and may only be decrypted using a key which is generated using DNA measurements of the associated person. This is to assure that prior to accessing potentially private information about a person, the person's DNA has already been recovered from a crime scene, thus making the person a suspect in a crime. While a person's DNA is not dynamic, imprecise measurement techniques or imprecise samples may result in having incomplete DNA measurements. In accordance with the techniques of the present invention, a repeatable key to unlock the database records could be generated with this incomplete DNA information.

In advantageous embodiments, the invention may be implemented using a programmable computer. Such a computer comprises a processor for executing computer program code stored in a memory which is accessible by the processor. As used herein, the term memory is used to refer to any computer readable medium, including without limitation, random access memory (RAM), read only memory (ROM), magnetic disk, optical disk, and holographic memory. In an advantageous embodiment, the computer program code is stored in a high speed memory, such as a RAM, which is connected to the computer processor. The computer program code required to implement the invention may be written in any well known computer language. Given the present description of the invention, one of ordinary skill in the art to which the invention pertains could readily write the program code necessary to implement the invention. The data structures described below (e.g. the share table) are also stored in memory. A user interacts with the computer using well known input/output devices and techniques (e.g. display screen, keyboard, mouse). Programmable computers of the type described herein are well known in the art and as such, further details are not required here.

As described above, we will assume that measurements of some physical characteristic have been taken and we are thus in possession of parameters $\phi_1, \phi_2, \ldots \phi_{m'}$ representing those physical characteristics. In one embodiment of the invention, a function $f$ is applied to the parameters $\phi_1, \phi_2, \ldots \phi_{m'}$ in order to generate a set of indices $\psi_1, \psi_2, \ldots \psi_m$ such that $f(\phi_1, \phi_2, \ldots \phi_{m'}) = \{\psi_1, \psi_2, \ldots \psi_m\}$. (The subscript m' is used for the parameters ($\phi$) to indicate that there need not be the same number of parameters ($\phi$) and indices ($\psi$)). The indices $\psi_1, \psi_2, \ldots \psi_m$ are used to access a set of stored values, where at least some of the stored values are so-called cryptographic shares of a secret sharing scheme. Secret sharing schemes and cryptographic shares will be described in further detail below. At this point, let it suffice to say that possession of a sufficient number of valid cryptographic shares of a secret sharing scheme may be used to generate the repeatable key. In order to provide security, not all the stored values represent valid cryptographic shares. Instead, the particular values in the set of values which contain valid cryptographic shares are chosen to correspond to values of the indices $\psi_1, \psi_2, \ldots \psi_m$ which are expected to be generated during a legitimate attempt to access the computer resource. The other values in the set (i.e., those for which corresponding indices are not expected to be generated during a legitimate access attempt) do not contain valid cryptographic shares. As will be described in further detail below, a designer of the security system will be able to identify the indices which would be expected to be generated during a legitimate access attempt.

As an example, consider the physical measurement parameters $\phi_1, \phi_2, \phi_3, \phi_4$ corresponding to 4 measured keystroke features of a particular user during the typing of a password. Further, assume that the function $f$ when applied to these parameters, produces a set of indices, each in the range of 1–10. For example, the indices in the range of 1–10 may be a result of normalizing the latency measurements. Also, assume that the user has engaged in a training session during which the user typed the password five times. After applying the function $f$ to the parameters $\phi_1, \phi_2, \phi_3, \phi_4$ generated during the training session, the indices $\psi_1, \psi_2, \psi_3, \psi_4$ were generated as follows:

password entry 1: $\psi_1, \psi_2, \psi_3, \psi_4 = 1,5,9,3$
password entry 2: $\psi_1, \psi_2, \psi_3, \psi_4 = 2,6,9,3$
password entry 3: $\psi_1, \psi_2, \psi_3, \psi_4 = 2,5,8,4$
password entry 4: $\psi_1, \psi_2, \psi_3, \psi_4 = 3,5,8,3$
password entry 5: $\psi_1, \psi_2, \psi_3, \psi_4 = 1,6,7,3$ From this information, a security designer can conclude that expected values of the indices for this user are as follows:

| INDEX | EXPECTED VALUES |
| --- | --- |
| $\psi_1$ | 1,2,3 |
| $\psi_2$ | 5,6 |
| $\psi_3$ | 7,8,9 |
| $\psi_4$ | 3,4 |

The indices are used to select values from a data structure called a share table, so named because it contains cryptographic shares. An exemplary share table is shown in FIG. 1 as table 100. The indices select values from the share table as follows. The first index $\psi_1$ selects a value from the first row, the second index $\psi_2$ selects a value from the second row, the third index $\psi_3$ selects a value from the third row, and the fourth index $\psi_4$ selects a value from the fourth row. The value of the particular index determines the column from which the value is selected. Thus, using conventional (row,column) notation, given an index $\psi_1$ a value is selected from the share table 100 at location (i, $\psi_1$).

Based on the expected values found during the training session, the locations in the share table 100 corresponding to the expected values for each of the indices will be set to contain valid cryptographic shares such that the repeatable key may be generated from those valid cryptographic shares. Those locations which do not correspond to the expected values for each of the indices will be set to contain values which are not valid cryptographic shares, called invalid cryptographic shares, such that the repeatable key may not be generated from those values. In FIG. 1, locations in share table 100 which contain valid cryptographic shares are identified with a √ and locations which contain invalid cryptographic shares are identified with a X.

Secret sharing schemes will be described in further detail below. For purposes of the present example, assume that four valid cryptographic shares are required to generate the repeatable key. Also assume that on a particular access attempt the user types his/her password and the function $f$ generates the following indices based on measurements of the keystroke features:

access attempt 1: $\psi_1, \psi_2, \psi_3, \psi_4$=2,6,8,4

Note that although this exact set of indices did not appear in any of the training sessions, each of the values is an expected value for the corresponding index. As such, the indices correspond to locations in the share table 100 which contain valid cryptographic shares. More particularly, index $\psi_1$ selects row 1, column 2 from the share table, index $\psi_2$ selects row 2, column 6 from the share table, index $\psi_3$ selects row 3, column 8 from the share table, and index $\psi_4$ selects row 4, column 4 from the share table. As can be seen from FIG. 1, each of these share table locations contains a valid cryptographic share as indicated by a √. As such, the correct repeatable key could be generated from the valid cryptographic shares and the user would be authenticated.

Alternatively, assume that the user types his/her password and the function $f$ generates the following indices based on measurements of the keystroke features:

access attempt 2: $\psi_1, \psi_2, \psi_3, \psi_4$=2,7,5,4

Note here that the index values for $\psi_2, \psi_3$ are not expected values for these indices and as such, the entries in the share table 100 corresponding to these indices (row 2, column 7 and row 3, column 5) contain X indicating an invalid cryptographic share. As such, the correct repeatable key could not be generated from these cryptographic shares and the user would not be authenticated. Further details of an advantageous keystroke feature authentication embodiment of the invention will be given below.

According to one embodiment of the invention, errors, or variations, in measured physical characteristics may also be tolerated by selecting share table locations which were not actually indexed by the set of indices generated by the function $f$. This error tolerance is advantageously accomplished by selecting share table locations which are in the vicinity of locations actually indexed by the indices generated by the function $f$. For example, assume the share table 100 shown in FIG. 1 and an embodiment in which four indices $\psi_1, \psi_2, \psi_3, \psi_4$ are generated. If the repeatable key is not generated correctly by selecting shares from the share table locations indexed by $\psi_1, \psi_2, \psi_3, \psi_4$, then the system may first attempt to vary the selection of a share table location associated with the first index $\psi_1$, by choosing, during two separate key generation attempts, the share table location on either side of the location indexed by $\psi_1$. If the generation of the repeatable key is unsuccessful, the system may then attempt to vary the selection of a share table location associated with the second index $\psi_2$ in a similar manner. These steps of varying the actual chosen share table location may continue for each of the indices. Of course, this process of varying the selection of share table locations may be extended in order to implement an appropriate security scheme for different embodiments of the invention. For example, during each key generation attempt, one or more share table locations may be chosen using this variation technique. Further, the amount of variation allowed for each location may vary. As described above, the variation consists of one table location on either side of the actual indexed location. However, the variation may also consist of more than one table location on either side of the actual indexed location. Additionally, depending on the implementation, it may be appropriate to vary the selection of a share table location for only certain of the indices. Of course, many other variation techniques may be used and are contemplated by this description.

Advantageously the invalid cryptographic shares in a share table should be chosen such that they cannot be readily recognized as invalid by an adversary who compromises the computer system data and gains access to the share table. In this way, the adversary would not be able to gain any information from the share table. Further, the values in a share table may be encrypted for further security. For example, as will be described in further detail below, in the keystroke feature authentication embodiment, the values in the share table are encrypted with the user's actual password in order to provide additional security.

Thus, as can be seen, the techniques in accordance with the present invention allow a repeatable key to be generated notwithstanding variations in measured physical characteristics. The amount of variation allowed is defined by the configuration of the share table as well as the error tolerance technique described above.

As described above, a share table contains at least some valid cryptographic shares of a secret sharing scheme. There are various types of secret sharing schemes, and various ones of these schemes may be used to generate the cryptographic shares for storage in the share table. One type of secret sharing scheme is a polynomial secret sharing scheme, the details of which are described in A. Shamir, *How To Share A Secret*, Communications of the ACM 22(11):612–613, November 1979, which is incorporated herein by reference. Since a detailed description of the scheme may be found in the reference, the scheme will only be described in general terms herein. A secret key k is chosen from the integers mod q, where q is prime. (For notational simplicity, unless otherwise stated, the calculations described below for generating the secret key k are performed mod q). Then, a threshold t is determined which represents how many cryptographic shares are required to generate the secret key k. This is a design choice that would be determined based on the particular embodiment of the invention. Next a degree t−1 polynomial p is chosen at random such that p(0)=k. This polynomial is illustrated in FIG. 2. Note that k is illustrated as the point at which the polynomial crosses the y axis, that is, p(0)=k. As is well known, a polynomial of degree d can be determined from a knowledge of d+1 points on that polynomial by using well known interpolation techniques. Thus, since p is a degree t−1 polynomial, knowledge of t points on that polynomial are sufficient to determine p. Further, once p is known, p(0) can be determined, which is the secret key k. Thus, by knowing t points on the polynomial, the secret key k can be determined as follows.

Given points $(x_1,p(x_1)), \ldots, (x_1,p(x_1))$ on the degree-(t−1) polynomial p over the integers mod q, the value k=p(0) can be computed as $$p(0) = \sum_{i=1}^{i} c_i p(x_i)$$

where $$c_i = \prod_{1 \leq j \leq i, j \neq i} \frac{x_j}{x_j - x_i}$$

Thus, in accordance with one embodiment of the invention, the valid cryptographic shares which are stored in the share table are points on the polynomial p. Any number of polynomial points can be stored in the table, with an understanding that access to any t of those points will be enough to generate the secret key k.

Referring to FIG. 2, examples of points on the polynomial, and therefore valid cryptographic shares in the polynomial secret sharing scheme, would be $(x_1,p(x_1)),(x_2,p(x_2)),(x_3,p(x_3)),(x_4,p(x_4))$. These valid cryptographic shares would be stored in share table locations which, as described above, correspond to expected index values which would be generated during a legitimate access attempt. Invalid cryptographic shares, to be stored in share table locations which do not correspond to expected index values, can be chosen from points off the polynomial p, for example points 201, 202, 203.

Thus, in a straightforward approach, polynomial points are stored in the share table locations as pairs $(x_i, p(x_i))$.

In an alternative to the straightforward approach, the cryptographic shares may be compressed in order to save memory space. In this approach, the inherent sequential ordering of the share table locations is utilized and points on the polynomial are chosen accordingly. Consider the share table 300 shown in FIG. 3. The share table 300 has 16 locations. In the upper left corner of each location is shown the standard (row,column) index of the location. In the upper right corner of each location is shown the sequence number of the location. In a table having n columns, the standard (row,column) index can be converted to the sequence number by the equation: sequence #=((row−1)·n)+column. For example, in the table shown in FIG. 3, n=4, and table entry (3,2) has a sequence number of ((3−1)·4)+2=10. In this embodiment, a valid cryptographic share is entered into a table location having sequence number s, by placing in that location the value $p(s_i)$. Thus, only they value of the polynomial point is stored in the table. The x value of the polynomial point is the sequence number of the share table location and can be derived from the standard (row,column) index. For example, in FIG. 3, location indexed by (3,2) would contain the value p(10). It is noted that in this embodiment, prior to generating a valid cryptographic share for storage in the share table, the particular location within the share table in which the cryptographic share will be stored must be known. The cryptographic share is decompressed using the stored y value in conjunction with the location in which it is stored. In this embodiment, the value stored in memory is considered a cryptographic share, and is stored in compressed format.

We now describe an embodiment which stores encrypted shares in the share table. In accordance with this embodiment, the share table is stored as a plurality of rows (corresponding to the number of parameters/indices that may be generated) but a single column. A share table 400 in accordance with this embodiment of the invention is illustrated in FIG. 4. In a manner similar to that described above in conjunction with FIG. 1, each row of the share table 400 (FIG. 4) corresponds to one of the indices ψ generated by applying the function $f$ to a parameter φ. Recall, as described above, $f(\phi_1, \phi_2, \ldots \phi_m) = \{\psi_1, \psi_2, \ldots \psi_m\}$. The share table 400 stores cryptographic shares (e.g. points on the polynomial) which have been encrypted (by an encryption function E) using the expected values of the indices $\{\psi_1, \psi_2, \ldots \psi_m\}$ as the encryption key, such that a polynomial point $(x_i, y_i)$ is encrypted as $E_{104_{1}-expected}(x_i, y_i)$. (The particular encryption function E would depend on the particular implementation.) As such, the stored encrypted shares may only be decrypted when an expected index value is generated. For example, the value stored in the share table 400 location corresponding to $\psi_1$ is $E_{\psi_1-expected}(x_1,y_1)$, which is a polynomial point $(x_1,y_1)$ which has been encrypted using the expected value of $\psi_1$ as the encryption key. The polynomial point $(x_1,y_1)$ can only be decrypted using the expected value of $\psi_1$ as the decryption key. Of course, when an unexpected value for an index is used to decrypt an encrypted share, the decrypted share will not be a valid polynomial point. Thus, in accordance with this embodiment, the share table will accommodate any number of values which may be generated for an index ψ. Any index value which is not expected will not be able to decrypt the stored encrypted share.

It is further noted that in accordance with the above described embodiment, a certain amount of parameter variation may be tolerated by varying the degree of the polynomial from which points are chosen as shares. As described above in conjunction with FIG. 2, given a degree t−1 polynomial, the knowledge of t points on that polynomial are sufficient to determine p and thus the secret key k. So, in this embodiment, even though an attempt may be made to decrypt m cryptographic shares, the degree of polynomial p may be chosen such that p may be determined from less than m points on the polynomial. Thus, even if one (or more) of the indices ψ is generated incorrectly, and as a result the decryption of the corresponding share results in a point which is not on the polynomial, the correct polynomial may still be determinable using other generated points which are on the polynomial. In this case, in which we possess a sufficient number of valid points on the polynomial, together with some invalid points off the polynomial, well known techniques may be used to exclude the bad points in the determination of p. For example, various subsets of the generated points may be used in multiple attempts to determine p, until some pattern emerges which indicates the valid and invalid points.

The above described embodiments were described assuming that the secret sharing scheme being used was a polynomial secret sharing scheme. However, other types of secret sharing schemes, some of which are described below, may also be used.

In another embodiment of the invention, the polynomial scheme is modified such that the secret key k is defined as $k = g^{p(0)}$ mod r where r is prime, r−1 is a multiple of q, and g has order q mod r, i.e., the set $\{g^0 \bmod r, g^1 \bmod r, g^2 \bmod r, \ldots\}$ contains q elements. Rather than storing $p(x_1), p(x_2), \ldots$ as cryptographic shares in the share table, instead the values $g^{p(x_1)}$ mod $r, g^{p(x_2)}$ mod $r, \ldots$ are stored as the cryptographic shares. Given pairs $(x_1, g^{p(x_1)} \bmod r), \ldots, (x_1, g^{p(x_1)} \bmod r)$, the value k can be computed as $$k = \prod_{i=1}^{i} (g^{p(x_i)} \bmod r)^{c_i} \bmod r$$

where $c_i$ is as defined above.

In another embodiment of the invention, the secret key k is computed as the determinant of am m×m matrix over the integers mod q. The cryptographic shares are vectors that are used to compose the matrix. For ease of description, we describe this embodiment for a table with two columns. In this embodiment, random column vectors $\vec{w}_1^0, \ldots, \vec{w}_m^0$, each with m elements taken from the integers mod q, are selected such that $k=|\vec{w}_1^0, \ldots, \vec{w}_m^0|$, i.e., k is the determinant of the matrix composed by these vectors. Another m random vectors $\vec{u}_1, \ldots, \vec{u}_m$ are then computed so that $$\forall b \in \{0,1\}^m : |\vec{u}_1^{b(1)}, \ldots, \vec{u}_m^{b(m)}| = 1$$

where $\vec{u}_i^{b(1)} = \vec{e}_i$ if b(i)=0 and $\vec{u}_i^{b(1)} = \vec{u}_i$ if b(i)=1. Here, b(i) denotes the i-th bit of b, and $\vec{e}_i$ denotes the unit vector with a 1 in position i and 0 in all other positions. Then, vectors $\vec{w}_1^1, \ldots, \vec{w}_m^1$ are computed as $\vec{w}_i^1 = (\vec{w}_1^0, \ldots, \vec{w}_m^0) \cdot \vec{u}_i$. The vector $\vec{w}_i^0$ is the valid cryptographic share for the first column of the i-th row of the share table, and similarly $\vec{w}_i^1$ is the valid cryptographic share for the second column of the i-th row of the share table. It then follows that for any $b \in \{0,1\}^m$, $|\vec{w}_1^{b(1)}, \ldots, \vec{w}_m^{b(m)}| = k$. That is, with one valid cryptographic share from each row, the secret key k can be computed.

An efficient algorithm to generate $\vec{u}_1, \ldots, \vec{u}_m$ is as follows. An upper-triangular matrix $U' = (u'_1, \ldots, u'_m)$ is chosen that has 1 for each diagonal element and random integers mod q above the diagonal. Then, $(\vec{u}_1, \ldots, \vec{u}_m) = \pi \cdot U' \cdot \pi^{-1}$ where $\pi = \vec{\pi}_1, \ldots, \vec{\pi}_m)$ is a permutation matrix (i.e., the identity matrix with columns permuted).

Figures 5, 6:
FIG. 5 illustrates a share table in accordance with a keystroke features authentication embodiment of the invention.
FIG. 6 illustrates a history table in accordance with a keystroke features authentication embodiment of the invention.

We now describe a keystroke features authentication embodiment of the invention in which the inventive techniques are used to provide authentication in a computer system based on an entered password and keystroke features measured during entry of the password. In this embodiment, each user is associated with a password, identified as pwd. Further, when a user enters the pwd, a certain number, m, of features of the user's keystroke features are measured or derived. A measured feature is one that is actually measured. For example, if the pwd is 8 characters, in one illustrative embodiment there are 15 measured features, including 8 keypress durations and 7 latencies between keypresses. A derived feature is one which is not directly measured, but is derived from a measured feature (e.g., the ratio of the $7^{th}$ and $8^{th}$ keypress durations). Assume for purposes of this description that there are 15 features (m=15). In this embodiment, a share table having m rows and 2 columns is used. Such a share table is shown in FIG. 5 and will described in further detail below.

Next a key k is chosen and cryptographic shares are generated using a secret sharing scheme as described above. Assume a polynomial secret sharing scheme is used and that the actual points of the polynomial are stored in the share table. Initially, 30 valid cryptographic shares are generated and each location in the share table 500 is initialized to contain a valid cryptographic share. In order to add an additional measure of security, all values in share table 500 are encrypted using pwd as the encryption key, and may be decrypted using pwd as the decryption key.

The function $f$ which generates the indices $\psi_i$ will now be described. For each measured keystroke feature parameter $\phi_i$, there is an associated threshold $h_i$ which is used during the generation of the index $\psi_i$ for the particular measured feature. The function $f$ is defined as follows:

$$f(\phi_1, \phi_2, \ldots \phi_m) = \{\psi_1, \psi_2, \ldots \psi_m\} \in \{0,1\}^m$$

where $$\psi_i \begin{cases} 0 \text{ if } \phi_i < h_i \\ 1 \text{ if } \phi_i \geq h_i \end{cases}$$

Thus, for each parameter representing a measured keystroke feature, the corresponding index generated by the function will be 0 if the parameter is less than the associated threshold and 1 if the parameter is greater than or equal to the associated threshold. The threshold $h_i$ may, for example, be a time value (e.g. 100 ms).

Each time a user enters a pwd each of the 15 keystroke features will be measured as a parameter $\phi_i$. The function $f$ will compare the parameter $\phi_i$ to the threshold $h_i$ associated with that measurement and will generate $\psi_i$ as having a value of 0 or 1 depending on which side of the threshold $\phi_i$ falls on. The value of $\psi_i$ is then used as an index into the ith row of the table 500. The left column of row i is chosen if $\psi_i$ is 0, and the right column of row i is chosen if $\psi_i$ is 1. The value in the selected entry of the ith row is used as the cryptographic share from that particular row. After cryptographic shares have been selected from all 15 rows, they are used as described above to generate the key k. As described above, the cryptographic shares must first be decrypted using pwd prior to using them to generate the key k.

Since all share table 500 locations initially have valid cryptographic shares, initial access attempts which provide the correct pwd (to allow decryption of the share table 500) will result in the generation of the correct key k. However, during subsequent access attempts, the access structure (i.e., the sets of entries in the share table which enable generation of the cryptographic key) defined by share table 500 is reduced based on the typing patterns of the user. This is accomplished through use of a history table, which stores the parameters $\phi_1, \phi_2, \ldots \phi_m$ for a given number of previous successful access attempts for each user. An illustrative history table 600 is shown in FIG. 6. As the history table 600 is populated with parameters, certain typing patterns of the associated user can be determined. Each of the measured parameters can be analyzed to determine if one of the parameters is associated with a distinguishing feature. A distinguishing feature is one which can be used to distinguish this user from other users. If a parameter $\phi_i$ is consistently substantially more or less than the associated threshold $h_i$, then the associated feature is considered a distinguishing feature, and the share table 500 may be rebuilt to make use of this distinguishing feature as follows. If a parameter $\phi_i$ in the history table 600 is consistently on one side of the associated threshold $h_i$, then it is assumed that this parameter $\phi_i$ will continue to be on the same one side of the associated threshold $h_i$ during subsequent legitimate access attempts by the same user. As such, the entry in the share table 500 corresponding to the other side of the threshold for this parameter will be changed to contain an invalid cryptographic share. Thus, the access structure defined by share table 500 is thus reduced and in this way the share table 500 is modified to reflect the typing patterns of the authorized user.

The history table can be analyzed and corresponding changes made to the share table 500 on a periodic basis. This may be done after every successful access by the user, after some number of successful accesses, or after some time period has elapsed. In an advantageous embodiment, when making changes to the share table 500, the key k remains the same, but the entire table is rebuilt using new cryptographic shares which are points on a new polynomial p. In this manner the share table, and therefore the access structure, dynamically adjust based on the user's typing patterns. Of course, depending on the typing patterns of the user, the share table may be modified to contain more, or less, valid cryptographic shares.

Also, as described above, the degree of the polynomial p may be chosen to allow generation of the correct cryptographic key even though one (or more) of the selected share table locations contain an invalid cryptographic share.

Thus, in order for the correct k to be generated, the user must enter the correct pwd (so that the cryptographic shares in the share table can be decrypted), and the pwd must be entered using keystroke features that will result in a sufficient number of valid cryptographic shares being chosen from the share table. A user could then be authenticated on the basis of whether the correct secret key k was generated. For example, this could be verified by decrypting a file with k and seeing if a correctly formatted file results, or by hashing k and comparing the result to a previously stored hash value.

We have found that it is advantageous to further implement an error tolerance scheme, as described above, in the keystroke features authentication embodiment. More particularly, we have found it advantageous to simultaneously vary the selection of two share table 500 locations in an attempt to generate the repeatable key. The variation consists of, for each of two share table rows, choosing the share from the column other than the column actually indexed by the associated index generated by the function $f$. Thus, if a repeatable key is not generated correctly based on the originally generated indices, then two rows of the share table 500 are chosen for variation. If the repeatable key is still not generated correctly, then another two rows are chosen for variation. This continues until the correct repeatable key is generated or until all two-row combinations have been exhausted.

The repeatable key k may also be used as an encryption key to encrypt the user's data in the computer.

We now describe an embodiment of the invention in which the inventive techniques are used to protect a database which stores private information of individuals (e.g., convicted felons) which is only meant to be used for legitimate criminal investigation purposes. For example, if a criminal is suspected of a crime the database record for only that particular criminal should be accessible by investigators. As such, each record in the database is encrypted and may only be decrypted using a key which is generated using DNA measurements of the associated person. This is to assure that prior to accessing potentially private information about a person, the person's DNA has already been recovered from a crime scene, thus making the person a suspect in a crime. While a person's DNA is not dynamic, imprecise measurement techniques or imprecise samples may result in having incomplete DNA measurements. In accordance with the techniques of the present invention, a repeatable key to unlock the database records could be used to preserve the security of the private information.

This embodiment of the invention utilizes the technique of storing shares generated with this incomplete DNA information encrypted with expected index values, which was described above in conjunction with FIG. 4. When a record containing sensitive information is to be stored in the database, assume that certain DNA measurement of a person are known. Referring again to FIG. 4, assume that m DNA measurements have been taken. An appropriate polynomial p is chosen of degree t−1, where it is desired that knowledge of t points on the polynomial will allow access to the record, where $t \leq m$. The record is encrypted using a key k which is the point on the polynomial p which crosses the y axis, and the encrypted record is stored in the database. A share table which would allow the record to be decrypted in appropriate circumstances is generated as follows. Each DNA measurement is assigned a sequence number (1, 2, . . . m) which correspond to parameters $\phi_1, \phi_2, \ldots \phi_m$ representing those measurements. A function $f$ is chosen such that $f(\phi_1, \phi_2, \ldots \phi_{m'}) = \{\psi_1, \psi_2, \ldots \psi_m\}$. For example, the function $f$ may be a hash function. Using knowledge of the expected values of $\psi_1, \psi_2, \ldots \psi_m$ together with knowledge of the polynomial p, points on the polynomial p are encrypted using expected index values as described above in conjunction with FIG. 4.

Thereafter, the stored record of a person may only be decrypted by someone in possession of the DNA of that person. In order to decrypt the record, the appropriate sequence of DNA measurements are made in order to generate the parameters $\phi_1, \phi_2, \ldots \phi_{m'}$ representing those measurements. The function $f$ is applied to the parameters $\phi_1, \phi_2, \ldots \phi_{m'}$ in order to generate indices $\psi_1, \psi_2, \ldots \psi_m$ such that $f(\phi_1, \phi_2, \ldots \phi_{m'}) = \{\psi_1, \psi_2, \ldots \psi_m\}$. Each generated index $\psi_i$ is used to decrypt the corresponding encrypted share ($E_{\psi_i\text{-}expected}(x_i, y_i)$) stored in the ith row of the share table in order to generate the polynomial point $(x_i, y_i)$. The set of generated polynomial points may be used as described above in order to generate the cryptographic key k, which is the point at which the polynomial crosses the y axis.

The foregoing Detailed Description is to be understood as being in every respect illustrative and exemplary, but not restrictive, and the scope of the invention disclosed herein is not to be determined from the Detailed Description, but rather from the claims as interpreted according to the fill breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for generating a repeatable cryptographic key using at least one parameter comprising the steps of:

generating at least one index as a function of said at least one parameter, said one parameter being from a plurality of varying parameters;

retrieving at least one cryptographic share from a memory location identified as a function of said at least one index; and generating said repeatable cryptographic key based on said at least one cryptographic share, wherein said generated repeatable cryptographic key remains the same from one said generating of said repeatable cryptographic key to a next generating of said repeatable cryptographic key regardless of whether said plurality of varying parameters change from said generating of said repeatable cryptographic key to said next generating of said repeatable cryptographic key.

2. The method of claim 1 wherein said at least one retrieved cryptographic share is encrypted, said method further comprising the step of:

decrypting said at least one cryptographic share.

3. The method of claim 2 wherein said step of decrypting comprises the step of:

decrypting using a value computed as a function of said at least one parameter.

4. The method of claim 1 wherein said at least one parameter represents at least one measurement of a physical property.

5. The method of claim 1 wherein the plurality of varying parameters change from said one generation of said repeatable cryptographic key to said next generation of said repeatable cryptographic key.

6. The method of claim 5 further comprising the step of:
retrieving a cryptographic share from a memory location in the vicinity of said memory location identified by said index.

7. The method of claim 5 wherein said step of generating at least one index comprises the step of generating the same index for a set of parameter values.

8. The method of claim 7 wherein said set of parameter values are within a predetermined range of values.

9. A method for generating a repeatable cryptographic key comprising the steps of:
measuring a plurality of keystroke features during entry of a password;
generating a plurality of indices using said plurality of keystroke features;
retrieving from a data structure a plurality of cryptographic shares as a function of said plurality of indices; and
generating said repeatable cryptographic key using said cryptographic shares wherein said generated repeatable cryptographic key remains the same from one said generating of said repeatable cryptographic key to a next generating of said repeatable cryptographic key regardless of whether said plurality of keystroke features change from said one generating of said cryptographic repeatable key to said next generating of said repeatable cryptographic key.

10. The method of claim 9 wherein said cryptographic shares represent points on a polynomial.

11. The method of claim 9 wherein said cryptographic shares represent vectors.

12. The method of claim 9 wherein said cryptographic shares are compressed.

13. The method of claim 12 wherein said cryptographic shares comprise y values of points on a polynomial and the corresponding x values are derivable from a data structure location.

14. The method of claim 9 wherein said plurality of keystroke features vary from said one generating of said repeatable cryptographic key to said next generation of said repeatable cryptographic key.

15. The method of claim 9 wherein said step of generating a plurality of indices as a function of said keystroke features comprises the step of:
for each of said keystroke features, generating one of two indices as a function of a threshold value, $h_i$, where said function is defined by:

$$f(\phi_1, \phi_2, \ldots \phi_m) = \{\psi_1, \psi_2, \ldots \psi_m\} \in \{0,1\}^m$$

where
$\phi$ represents said keystroke features, $\psi$ represents said indices, m is a particular number of measured features associated with said password; and $$\psi_i \begin{cases} 0 \text{ if } \phi_i < h_i \\ 1 \text{ if } \phi_i \geq h_i. \end{cases}$$

16. The method of claim 9 wherein said step of generating a plurality of indices as a function of said keystroke features comprises the step of:
for each of said keystroke features, generating one of a plurality of indices as a function of a plurality of threshold values, $h_i$, where said function is defined by:

$$f(\phi_1, \phi_2, \ldots \phi_m) = \{\psi_1, \psi_2, \ldots \psi_m\} \in \{0,1\}^m$$

where
$\phi$ represents said keystroke features, $\psi$ represents said indices, m is a particular number of measured features associated with said password; and $$\psi_i \begin{cases} 0 \text{ if } \phi_i < h_i \\ 1 \text{ if } \phi_i \geq h_i. \end{cases}$$

17. The method of claim 9 wherein said cryptographic shares stored in said data structure are encrypted, said method further comprising the step of:
decrypting said cryptographic shares using said password.

18. The method of claim 9 further comprising the steps of:
maintaining a history file containing information relating to prior successful key generation attempts; and
based on said history file, storing invalid cryptographic shares in data structure locations which are not expected to be accessed during subsequent legitimate key generation attempts.

19. A method for generating a repeatable cryptographic key using a plurality of varying parameters, said varying parameters representing physical measurements, said method comprising the steps of:
for each of said plurality of parameters:
generating at least one index using said parameter;
retrieving an encrypted cryptographic share from a memory location as a function of said at least one index;
decrypting said encrypted cryptographic share with a function of said parameter; and
generating said repeatable cryptographic key using said decrypted cryptographic shares, wherein said generated repeatable cryptographic key remains the same from one said generating of said repeatable cryptographic key to a next generating of said repeatable cryptographic key regardless of whether said plurality of varying parameters change from said one generating of said repeatable cryptographic key to said next generating of said repeatable cryptographic key.

20. The method of claim 19 wherein said physical measurements are measurements of DNA.

21. The method of claim 19 wherein said function of said parameter used to decrypt said encrypted cryptographic share is a hash function.

22. A data structure for use in generating a repeatable cryptographic key based on n parameters representing physical measurements, said data structure comprising:
n storage locations each associated with a respective one of said n parameters, each particular storage location containing an encrypted cryptographic share which was encrypted using an expected value of a function of the parameter associated with said particular storage location, each said n storage location being associated with at least one index of a plurality of indices, where said plurality of indices are generated using said physical measurements such that said repeatable cryptographic key remains the same from one generation to a next generation of said repeatable cryptographic key regardless of whether said n parameters change from said one generation of said repeatable cryptographic key to said next generation of said repeatable cryptographic key.

23. The data structure of claim 22 wherein said function is a hash function.

24. The data structure of claim 22 wherein said repeatable cryptographic key may be generated using less than n cryptographic shares.

* * * * *